Patented Aug. 12, 1952

2,606,896

UNITED STATES PATENT OFFICE 2,606,896

METHOD OF PREPARATION OF WATER-SOLUBLE AZO DYES AND WATER-SOLUBLE BASES THEREFOR

Louis F. Koberlein, New York, N. Y., and Otto Poltersdorf, Paterson, N. J., assignors to Interchemical Corporation, New York, N. Y., a corporation of Ohio No Drawing. Application August 7, 1947, Serial No. 767,346

9 Claims. (Cl. 260—141)

This invention relates to new, soluble addition compounds of amines, to the formation of new, soluble compositions from such addition compounds, and more specifically, to the preparation of new, soluble dyestuff derivatives.

It is the object of the present disclosure to obtain, by means of new methods of synthesis, new types of various dyes, especially basic azo dyes and, in applying them in commercial dyeing, to attain a higher degree of economy.

Azo dyes are ordinarily produced in the form of insoluble precipitates by adding a solution of a diazo compound (prepared by treating a primary aromatic amine with nitrous acid) to an alkaline solution of a phenol or to a faintly acid or neutral solution of an amine. As long as they have no acidic or basic salt forming groups incorporated in the molecule, such dyes are water insoluble and for this reason require elaborate dyeing techniques, especially in dyeing fibers or fabrics from cellulose derivatives, or from polyamides, where it was found that basic azo dyes, rendered soluble through the incorporation of aforementioned solubilizing groups, show a very poor coloring effect and where, for the dyeing in deep color shades, the use of the free color base is absolutely essential.

Of the various procedures which at one time or another have been used for the dyeing of acetate rayon with such dyes, today the so-called dispersion method remains outstanding, preparatory to which the dyestuff is produced in substance, the precipitate separated from the process solution, and after washing, drying, pulverizing, and mixing with various dispersing agents, is sold to the dyer in the form of a powder. Before it can be used in dyeing, this powder must be pasted, screened into the dye bath to eliminate any coarse or unwetted particles and more dispersing agent and various dyeing aids must be added in order to obtain a degree of dispersion of the dye particles which will result in an even coloring effect.

As an alternative, the development of the color on the goods is sometimes practiced but this process is preferably avoided, whenever possible, in view of the excessive equipment requirements and the demands which are made thereby upon the skill of the operator. Although the trade has now generally adopted the aforementioned dispersion method in dyeing acetate rayon and nylon goods, it is obvious that a procedure which includes such a multiplicity of steps, from the time the dye is synthesized until the goods are dyed, is far from perfection and, in fact, represents a compromise which had to be resorted to in the absence of anything better. The realization that on the one hand only the free, insoluble dye bases gave the desired color effects, while on the other hand uniform dyeing was made extremely difficult with dyes which had to be used in their solid, particulate state, confronted workers in the field with a dilemma which they tried to overcome by milling and dispersing the dye particles to the highest possible degree so that a dyeing effect would be accomplished with dispersions, similar to that of a dye solution. However, were it not for the heretofore lack of a method to produce a soluble form of basic colors which could be used in dyeing cellulose acetate and nylon, the entire procedure of making, preparing, and using such dyes would appear to be contradictory to sound technical and economic principles as consisting, in fact, of an endeavor to undo at the end what had been done in the beginning, namely, producing the dye in the form of insolubles.

These difficulties have been realized in the past and many attempts have been made to overcome them. One way has been to take advantage of the solubility of basic azo dyes in organic solvents. For obvious reasons, solvent solutions of dyes were not favorably accepted by the trade.

We have now discovered that many dyes which ordinarily are not water soluble, due to the absence of solubilizing groups on the dyestuff molecule, may be synthesized in form of water soluble addition compounds and that such solutions may be used directly in dyeing various materials. We prepared these dye solutions after finding that a specific group of addition compounds made with various nitrogen derivatives of the aliphatic and cyclic series may be rendered water soluble, and that solutions of addition compounds of primary aromatic amines may not only be diazotized, in many instances more readily and much more economically than by means of known processes, but that these diazotized addition compounds, besides being much more stable, may easily be coupled in the customary manner through condensation of the nitrogen of the diazo groups with a phenol or an amine, whereby, however, water soluble coupling products are obtained in contrast to the known procedures. Our discovery points the way to an entirely new technique of preparing dyes, providing thereby improved products and methods especially adapted for coloring acetate rayon and nylon.

We found that tetrazo compounds of diamino derivatives may easily be prepared by means of our technique and that they may be coupled without decomposition even though the customary precautions, such as cooling to especially low temperatures, have not been taken.

Our invention of applying certain addition compounds of basic amines in the synthesis of new dyestuff derivatives which have the advantage over known products of being water soluble, is based on the discovery that it is possible to treat a water insoluble amine with specific water soluble compounds which contain a plurality of solubilizing groups, such as sulfonic groups, and to obtain thereby a water soluble addition compound. This is the more surprising, as it amounts to a reversal of the well known observation that it is possible to take water soluble derivatives, such as sulfonic acid derivatives of the benzene and naphthalene series, and, by treating therewith a water soluble amine salt, such as an amine-hydrochloride, obtain a water insoluble addition compound. We found that this reversal occurs when more of the water soluble derivative is added and that, if the latter exceeds a well defined ratio, the originally insoluble addition compounds may be completely solubilized.

We obtain these soluble addition compounds by treating basic nitrogen derivatives with aqueous solutions of condensation products which we produce from constituents of the phenyl or naphthalene series, by condensing them with formaldehyde, followed by sulfonation, or by treating the basic nitrogen derivatives with solutions of phenol or naphthalene derivatives which had been sulfonated first and then condensed with formaldehyde, whereby in either instance the presence of aliphatic side chains and/or hydroxy or carboxylic groups on the ring seem to aid further in the solubilizing effect of the condensation product.

A number of such large molecular condensates are commercially available and may be obtained as the neutralized products or in their free, acidic form.

In preparing the addition compounds of basic nitrogen derivatives, the latter are simply dissolved, or, if insoluble, suspended in water and one of the above condensation products is added in sufficient quantities to transform all of the nitrogen compound into the solubilized addition derivative. If a condensation product is used which is present in its neutralized form, care must be taken to sufficiently acidify in order to reactivate the solubilizing groups. Since the amount of condensation product which will be needed, may vary with its individual properties, and inasmuch as it was found that, aside from the presence and relative ratio of solubilizing groups, such as the —$SO_3H$, —COOH, —$C_2H_4OH$, or —OH group in the condensation product, the basicity of the amine involved appears to be another dominating factor governing the formation of the soluble addition compounds, it is advisable to initially determine the solubility factor by means of a small scale experiment, by adding, with continuous agitation, successive amounts of the amine to an aqueous solution of a given amount of the condensation product, until a point is reached where, although the addition compound may still form, it will no more solubilize.

The preparation of the condensation products which we employ is well known and has frequently been described in the patent and other literature. For example, we produce one of them by condensing a 65 percent solution of one molecular equivalent p-phenol sulfonic acid with a 37 percent solution of 0.5 molecular equivalents formaldehyde, and heating the mixture, while stirring, to 70–90° C., adding some water if the mass becomes too stiff for easy agitation and continuing the heating until the odor of formaldehyde has disappeared. Upon cooling, a resinous solid mass results which is easily soluble in an excess of water. We found that of this particular condensation product about 13 parts per weight are required to form, in an aqueous solution thereof, a soluble addition compound with one part per weight of a basic nitrogen derivative such as p-nitroaniline, m-nitroaniline, ethanol ethyl aniline, m-tolyl diethanolamine, m-phenylene diamine and numerous other amines which are known to be useful as dyestuff intermediates. We found that 18 parts, however, will be required of a similar formaldehyde condensation product with naphthalene sulfonic acid, but that the required ratio with what we think to be a formaldehyde condensation product of a sulfonated isopropyl naphthalene derivative is only eight to one. Such variations in the required amount will occur with every specific condensation product and there may be others which may exert a still higher solubilizing action and of which, in consequence, a still smaller proportion will be required. The formation of the solubilized addition compounds proceeds, as a rule, at a slow rate, and best at a pH value below 3.1 or at a positive acidity to Congo red. The solution or suspension should be stirred well until the quickly formed addition compound has been completely solubilized. Only a suspension will result if an insufficient amount of the condensation product has been used. The addition compounds, after having been completely dissolved, may easily be isolated from the solution by techniques such as salting out with sodium chloride or sodium sulphate and identified thereafter as addition products.

We have now discovered that soluble addition compounds, produced in this manner from primary aromatic amines, may be diazotized, whereby it is most significant that:

(a) The resulting diazo compounds are obtained in form of addition products which can be isolated and identified as such, (b) The diazo bodies of these new addition compounds prove to be far more stable than those of the known diazo compounds, (c) Diazotation may be accomplished without the precautions which, until now, have been required in certain cases, (d) Considerable savings may be made on reagents needed in diazotizing when following the new method, (e) When these new diazo compounds are coupled with the type of coupling components which are normally used in the preparation of dispersion colors, the dyes are obtained in form of a solution instead of an insoluble precipitate such as would result from a customary diazotation and coupling.

Since these soluble coupling products may be used directly for the dyeing of acetate silk and nylon, without separation from the process solution or any other treatment, they prove to be far more economical to manufacture and use. In addition, the new solutions give better dyeing effects and provide a higher degree of uniformity in dyeing different batches.

Most noteworthy are the savings in time, labor and equipment tie-up, which characterizes our methods, in comparison with the preparation of dispersion colors.

|   | Average time requirements in the preparation of— | |
|---|---|---|
|   | the here disclosed dye solutions | the customary dispersion dyes |
|   | hours | hours |
| forming soluble addition compounds between the dye intermediate and the condensation product | 16 |   |
| diazotation and coupling | 12 | 8 |
| filtration and washing |   | 5 |
| drying |   | 72 |
| pulverizing |   | 3 |
| ball milling and standardizing |   | 48 |
| pulverizing |   | 7 |
| packing | 5 | 2 |
| total | 33 | 145 |

The following examples illustrate the invention without being in any way limitative as to the scope.

*Example I*

179 gr. of the neutralized condensation product which is obtained by heating 1 mol phenol sulfonate with 0.5 mol formaldehyde are dissolved in 400 cc. water. After the addition of 13.8 gr. m-nitroaniline and about 25 cc. conc. hydrochloric acid in order to adjust the acidity to acid reaction with Congo red, the mixture is stirred until the addition compound which forms has been completely solubilized.

*Example II*

While it was found that most amines produce soluble addition compounds with the condensation product of Example I at a ratio of 1:13, 2,4-dinitroaniline is one of the exceptions, requiring at least 39 parts of this condensation product in order to go completely in solution, or about 24 parts if the addition compound is formed with the formaldehyde condensate of isopropyl-naphthalene sulfonate.

18.3 gr. 2,4-dinitroaniline are suspended in about 2000 gr. of a 35 percent aqueous solution of the phenol sulfonate-formaldehyde condensate of Example I. About 30 cc. conc. sulfuric acid are sufficient to give an acid test on Congo red paper. The mixture is then stirred for about 16 hours. At the end of this period the formation of the soluble addition compound is completed.

In order to diazotize this addition compound it is only necessary to cool to 0°–5° C., add about 7.2 gr. sodium nitrite dissolved in some water and stir for several hours or set in an ice box over night. An excellent diazo is obtained having no insoluble material present.

In addition to the simplicity of the diazotation procedure, the new method results in a saving of 80 percent of the amount of sulfuric acid which would ordinarily be required for the diazotation of dinitroaniline and similar weak bases.

If one were to follow accepted procedures for the diazotation of weakly basic amines, such as the 2,4-dinitroaniline, it would first be necessary to make a nitrosyl sulfuric acid by slowly adding about 7 gr. of dry sodium nitrite to 150 cc. conc. sulfuric acid while stirring, the temperature not being allowed to rise above 40° C. At about 30° to 35° C., 18.3 gr. of the dinitroaniline would then slowly be added and the mixture stirred while the temperature would be allowed to fall. When a test drop with water would show only a slight precipitation of the base, the mixture would be poured on ice, left standing to allow impurities to settle and would finally be filtered.

o-Chlor-p-nitroaniline, m-nitro-p-toluidine, p-nitroaniline, α-naphthylamine, m-nitroaniline and other amines which ordinarily require special methods of diazotation can be diazotized by ordinary procedures if present in form of the here claimed addition compounds.

We found one amino derivative, however, which does not lend itself readily to the new technique, namely, 2,6-dichlor-4-nitroaniline. Amine compounds of low basicity products such as this seem to strongly resist solubilizing, requiring relatively large quantities of the condensation product until a dissolution is accomplished, thus making the new method commercially unattractive. In such cases the amine compound is preferably treated in the orthodox manner of treating the free base, i. e. diazotizing in nitrosyl sulfuric acid after dissolving in pyridine.

*Example III*

The clear brownish yellow diazo solution of the addition compound obtained according to Example II is coupled with 20 gr. diethanol m-toluidine, whereby an addition compound of a dyestuff forms which is in complete solution and can be used directly in dyeing, without isolation or further processing.

In contrast thereto, after coupling, for example, the diazo of 2,4-dinitroaniline which is produced in the customary manner, alkaline treatment is required in order to neutralize the large quantites of sulfuric acid which are used. A tarry product is thereby obtained which requires extensive washings to remove the alkali sulfate and which necessitates the steps of drying, grinding, mixing with dispersing agent, and micropulverizing before it can be used for dyeing purposes.

*Example IV*

The clear brownish yellow diazo solution of the addition compound obtained according to Example II is coupled with the soluble addition compound of m-tolyl di-ethanolamine, made as follows:

20 gr. m-tolyl diethanolamine and 260 gr. of the phenolsulfonate-formaldehyde condensate of Example I are dissolved in 450 cc. water. The solution is acidified with 15 cc. conc. hydrochloric acid. Upon combining the diazo with the amine solution and after stirring for several hours, a dye liquid results which requires no further processing but can be used directly for dyeing acetate silk of nylon.

*Example V*

138 gr. p-nitroaniline are suspended in 5120 cc. of a 35 percent solution of the phenolsulfonate-formaldehyde condensate of Example I, sufficient sulfuric acid is added to give a positive acidity to Congo red paper and the suspension is agitated for about 16 hours to form the addition compound. This addition compound diazotizes readily after acidifying with 184 gr. conc. $H_2SO_4$, cooling to 0° C. and adding rapidly 72 gr. of sodium nitrite. Stirring for one hour produces a clear diazo addition compound, free from any insoluble material. It can be coupled with secondary or tertiary amines, whereby soluble dyestuff derivatives are obtained.

The ease with which this addition compound diazotizes is the more surprising since p-nitroaniline, without specific precautions (such as dissolving in concentrated acid, drowning the warm solution in ice water to precipitate the free base in a finely divided form and then diazotizing will form a diazo amino derivative instead of an azo body.

m-Nitroaniline, o-nitroaniline and o-chlor-p-nitroaniline may be diazotized in the same manner.

*Example VI*

Addition products of diamines, such as benzidine, tolidine, dianisidine, diamino diphenylamine and others are readily tetrazotized by our now technique.

10.8 gr. m-phenylene diamine are dissolved, with agitation, in 560 cc. of a 35 percent solution of the phenol-sulfonate-formaldehyde condensation products of Example I. 20 cc. of concentrated hydrochloric acid is added and the solution is iced to 0° C. After the addition of 14.4 gr. sodium nitrite (dissolved in about 50 cc. of water) and agitating for 15 minutes, a tetrazo addition compound forms which is ready for coupling.

Heretofore, the tetrazotization of m-phenylene diamine or m-tolylene diamine has been quite difficult. In order to tetrazotize 0.1 mol of the former, for instance, it was necessary to pour fuming hydrochloric acid (80 cc.) onto ice (400 gr.) and to keep the reaction temperature below minus 15° C. by means of a freezing mixture. Immediately after having added a cold solution of sodium nitrite (15 gr.), an already prepared, cooled solution of m-phenylene diamine (acidified with 10 cc. of concentrated hydrochloric acid) had to be poured into the mixture. Without these precautions the tetrazo compound would decompose or form complexes.

Beside the simplicity of our method as against this standard procedure, it is noteworthy that our requirements of hydrochloric acid are reduced to less than one-fourth.

*Example VII*

The addition compound of 9.3 gr. aniline and 121 gr. of the phenolsulfonate-formaldehyde condensation product of Example I, dissolved in 300 cc. water, is diazotized according to the method of Example II. After standing in an ice box for seven days, the diazo is still present.

A similar stability may be observed of the tetrazotized addition compound of m-phenylene diamine of Example VI, although the tetrazo of the free base decomposes rapidly, even in the cold.

*Example VIII*

A soluble addition compond of α-naphthylamine is prepared and diazotized in the disclosed manner.

Adding thereto another solution of the addition compound of α-naphthylamine results in a rapid coupling, and in a dye solution which produces an orange color on acetate rayon. Upon renewed diazotation and coupling on the fiber with β-oxy-naphthoic acid the color turns to black.

Using normal procedures, this dye would be very impractical to prepare and would have hardly any value for the dyeing of acetate rayon or nylon.

*Example IX*

Cellulose acetate or nylon is dyed black by means of the following one-bath developing method: The dye p-nitro-aniline-diethanol aniline, reduced with sodium sulphide, is suspended in an aqueous, acid solution of the condensation product of Example I. After stirring for several hours the formation of a soluble additive compound is completed. The solution is cooled to 0° C. and treated with sodium nitrite, whereby a soluble diazo forms. After adding one mol equivalent of diethanolamine, sodium carbonate is added slowly until a test gives an alkaline reaction on Brilliant Yellow paper. A water soluble diazo amino body forms. After mixing two mol equivalents β-oxy-naphthoic acid and padding the cellulose acetate goods therewith, an excellent black dye may be developed on the fiber by acidifying the dye bath with mineral acid to a pH of about 3.1.

*Example X*

The diazo of p-nitroaniline is prepared according to Example V.

170 gr. ethanol ethyl aniline are suspended in 630 cc. of a 35 percent solution of the aforementioned condensation product and made acid to Congo red paper with conc. sulfuric acid. After adjusting the volume to 700 cc., the sample is agitated until the addition compound has been completely dissolved. The solution is cooled to 0° C. and coupling brought about by adding the diazo. A scarlet shade dye solution is obtained which has affinity for cellulose acetate fibre.

We claim:
1. The method of preparing a water-soluble addition compound of a water-insoluble azo dye which comprises forming, in an aqueous medium, an addition compound of a water insoluble basic-reacting primary aromatic amine and the condensation product of formaldehyde with a sulfonated aromatic derivative of the group consisting of phenols and naphthalenes, said condensation product being water-soluble and present in an amount providing free sulfonic acid groups sufficient to solubilize the addition compound, diazotizing said dissolved addition compound and coupling the dissolved diazo compound with a coupling agent.

2. The method of preparing a water-soluble addition compound of a water-insoluble azo dye which comprises forming, in an aqueous medium, an addition compound of 1 part of 2,4-dinitroaniline and not less than 39 parts of the condensation product of 0.5 mole of formaldehyde with one mole of p-phenol sulfonic acid, diazotizing the dissolved addition compound and coupling the dissolved diazo compound with a coupling agent.

3. The method of preparing a water-soluble addition compound of a water-insoluble azo dye which comprises forming, in an aqueous medium, an addition compound of 2,4-dinitroaniline and the condensation product of formaldehyde with a sulfonated aromatic derivative of the group consisting of phenols and naphthalenes, said condensation product being water-soluble and present in an amount providing free sulfonic acid groups sufficient to solubilize the addition compound, diazotizing said dissolved addition compound and coupling it with an aqueous solution of the m-tolyl diethanol amine addition compound of the condensation product of 0.5 mole of formaldehyde with one mole of p-phenol sulfonic acid, the proportion of the latter condensation product to m-tolyl diethanol amine being not less than 13 to 1.

4. The method of preparing a water-soluble addition compound of a water-insoluble azo dye which comprises forming, in an aqueous medium, an addition compound of m-phenylene diamine and the condensation product of formaldehyde with a sulfonated aromatic derivative of the group consisting of phenols and naphthalenes, said condensation product being water-soluble and present in an amount providing free sulfonic acid groups sufficient to solubilize the addition compound, tetrazotizing said dissolved addition compound and coupling the dissolved tetrazo compound with diethanol-m-toluidine.

5. The method of preparing a water-soluble addition compound of a water-insoluble basic-reacting primary aromatic amine which comprises mixing, in an aqueous medium, said aromatic amine with the condensation product of formaldehyde with phenol sulfonic acid, said condensation product being water-soluble and present in an amount providing free sulfonic acid groups sufficient to solubilize said addition compound.

6. The method of claim 5 in which one part of m-tolyl diethanol amine is mixed with not less than 13 parts of the water-soluble condensation product of 0.5 mole of formaldehyde with 1 mole of p-phenol sulfonic acid.

7. The method of preparing a water-soluble addition compound of a water-insoluble basic-reacting primary aromatic amine which comprises mixing, in an aqueous medium, said aromatic amine with the condensation product of formaldehyde with a sulfonated aromatic derivative of the group consisting of phenols and naphthalenes, said condensation product being water-soluble and present in an amount providing free sulfonic acid groups sufficient to solubilize said addition compound.

8. The method of preparing a water-soluble diazo addition compound which comprises mixing, in an aqueous medium, 1 part of 2,4-dinitroaniline with not less than 39 parts of the water-soluble condensation product of 0.5 mole of formaldehyde with 1 mole of p-phenol sulfonic acid, and diazotizing the dissolved addition compound formed.

9. The method of preparing a water-soluble tetrazo addition compound which comprises mixing, in an aqueous medium, m-phenylene diamine with the condensation product of formaldehyde with a sulfonated aromatic derivative of the group consisting of phenols and naphthalenes, said condensation product being water-soluble and present in an amount providing free sulfonic acid groups sufficient to solubilize the addition compound with m-phenylene diamine, and tetrazotizing the said dissolved addition compound.

LOUIS F. KOBERLEIN.
OTTO POLTERSDORF.

REFERENCES CITED

The following references are of record in the file of this patent:

UNITED STATES PATENTS

| Number | Name | Date |
|---|---|---|
| 1,500,844 | Plauson | July 8, 1924 |
| 2,012,928 | Hassler | Aug. 27, 1935 |
| 2,270,681 | De Groote | Jan. 20, 1942 |
| 2,353,544 | Caccia | July 11, 1944 |
| 2,498,722 | Straley | Feb. 28, 1950 |